US006254970B1

(12) United States Patent
Hiatt et al.

(10) Patent No.: US 6,254,970 B1
(45) Date of Patent: Jul. 3, 2001

(54) SUBSTRATES FOR HEAT TRANSFER LABELS

(75) Inventors: Norman A. Hiatt, Framingham; Paul D. Christo, Duxbury, both of MA (US)

(73) Assignee: International Playing Card & Label Co., W. Palm Beach, FL (US)

( * ) Notice: Subject to any disclaimer, the term of this patent is extended or adjusted under 35 U.S.C. 154(b) by 0 days.

(21) Appl. No.: 09/168,471

(22) Filed: Oct. 8, 1998

(51) Int. Cl.[7] .............................. B32B 3/00; B32B 7/06; B32B 7/10

(52) U.S. Cl. .......................... 428/200; 428/202; 428/211; 428/343; 428/347; 428/913; 428/914; 428/480; 428/484; 428/474

(58) Field of Search .................................... 428/202, 484, 428/195, 480, 200, 474, 211, 343, 347, 537.5, 913, 914

(56) References Cited

U.S. PATENT DOCUMENTS

| | | | |
|---|---|---|---|
| 1,030,908 | 7/1912 | McKerrow . | |
| 1,331,581 | 2/1920 | Rosenfeld . | |
| 1,882,593 | 10/1932 | Hentschel . | |
| 1,899,066 | 2/1933 | Tonge . | |
| 1,939,821 | 12/1933 | Lawrence . | |
| 1,941,697 | 1/1934 | Lawrence . | |
| 1,968,083 | 7/1934 | Lawrence . | |
| 1,990,193 | 2/1935 | Lohmann . | |
| 2,219,071 | 10/1940 | Humphner . | |
| 2,375,177 | 5/1945 | Reese . | |
| 2,556,078 | 6/1951 | Francis, Jr. . | |
| 2,558,803 | 7/1951 | Wittgren . | |
| 2,667,003 | 1/1954 | Von Hofe . | |
| 2,688,579 | 9/1954 | Meyer . | |
| 2,733,997 | 2/1956 | Asnes . | |
| 2,746,893 | 5/1956 | Matthes . | |
| 2,862,832 | 12/1958 | Shepherd, Jr. . | |
| 2,920,009 | 1/1960 | Humphner . | |
| 2,970,076 | 1/1961 | Porth . | |
| 2,989,413 | 6/1961 | Shepherd, Jr. . | |
| 2,990,311 | 6/1961 | Shepherd, Jr. . | |
| 3,007,829 | 11/1961 | Akkeron . | |
| 3,013,917 | 12/1961 | Karlan et al. . | |
| 3,014,828 | 12/1961 | Reese . | |
| 3,043,732 | 7/1962 | Shepherd, Jr. . | |
| 3,131,106 | 4/1964 | MacKenzie . | |
| 3,276,933 | 10/1966 | Brant . | |
| 3,434,902 | 3/1969 | Bliss . | |
| 3,516,842 | 6/1970 | Klinker, Jr. et al. . | |
| 3,516,904 | 6/1970 | Klinker . | |
| 3,616,015 | 10/1971 | Kingston . | |
| 3,708,320 | 1/1973 | Hurst et al. . | |
| 3,741,787 | 6/1973 | Tordjman . | |
| 3,907,974 | 9/1975 | Smith . | |
| 3,922,435 | 11/1975 | Asnes . | |
| 4,019,935 | 4/1977 | Harvey . | |
| 4,342,281 | 8/1982 | McMillin et al. . | |
| 4,392,905 | 7/1983 | Boyd et al. . | |
| 4,426,422 | 1/1984 | Daniels . | |
| 4,511,425 * | 4/1985 | Boyd et al. | 156/493 |

(List continued on next page.)

FOREIGN PATENT DOCUMENTS

| | | |
|---|---|---|
| WO 90/00940 | 2/1990 | (WO) . |
| WO 98/00294 | 1/1998 | (WO) . |
| WO 98/26021 | 6/1998 | (WO) . |

*Primary Examiner*—Bruce H. Hess
*Assistant Examiner*—B. Shewareged
(74) *Attorney, Agent, or Firm*—Mintz, Levin, Cohn, Ferris, Glovsky and Popeo, P.C.

(57) ABSTRACT

A heat transfer label system is disclosed. The invention is characterized in that it employs a carrier substrate and transfer release agent that minimizes or eliminates the transfer of the transfer release agent to the label during the process in which the label is affixed to a surface such as a package surface.

19 Claims, 3 Drawing Sheets

U.S. PATENT DOCUMENTS

| | | | |
|---|---|---|---|
| 4,536,434 | | 8/1985 | Magnotta . |
| 4,548,857 | | 10/1985 | Galante . |
| 4,555,436 | | 11/1985 | Geurtsen et al. . |
| 4,557,964 | | 12/1985 | Magnotta . |
| 4,581,266 | | 4/1986 | Magnotta . |
| 4,927,709 | | 5/1990 | Parker et al. . |
| 4,935,300 | | 6/1990 | Parker et al. . |
| 5,104,719 | | 4/1992 | Kamen et al. . |
| 5,284,688 | * | 2/1994 | Hiatt ....................................... 428/40 |
| 5,366,251 | | 11/1994 | Brandt et al. . |
| 5,458,714 | | 10/1995 | Brandt et al. . |

* cited by examiner

SUBSTRATES FOR HEAT TRANSFER LABELS

FIELD OF THE INVENTION

This invention relates to the field of heat transfer labels. More particularly, the invention relates to improvements in the substrates used to carry labels prior to heat transfer of the labels onto a surface.

BACKGROUND OF THE INVENTION

Heat transfer label technology has been used since the early 1900's for decorating textiles and leather. In the late 1950's and early 1960's, the process was first applied to plastics. More recently, the technology has been used to provide labels on numerous surfaces, including plastic bottles.

The most common form of heat transfer label uses a wax layer as a transfer agent. In particular, the conventional heat transfer label is a multi-layered structure which incorporates a carrier or substrate, a transfer agent, inks and an adhesive layer. Optionally, a protective lacquer layer may be included as well. One such label is shown in FIG. 1. In FIG. 1, the heat transfer label 10 includes a carrier substrate 11 comprised of a supporting carrier 12 and a wax transfer agent 14, an optional protective lacquer 16, one or more inks 18, and an optional adhesive lacquer 20. Typically, the adhesive lacquer is provided, however, certain inks having a high binder content adhere well to surfaces, thereby eliminating the need for the adhesive lacquer. The supporting carrier 12 typically is a paper material, and can comprise a calendered paper or a coated paper, such as a clay coated paper. Other carrier substrates that have been used include wax-coated papers, papers coated with polymeric extrusions such as polyethylenes, polypropylenes and nylons, laminates of polyethylene or polypropylene to paper, silicone-coated papers, and polyester films having release coatings.

The transfer agent 14 is typically a layer of a material, such as wax, that melts when heated, thereby allowing the inked portion of the label to be removed from the carrier substrate 12 and adhered to a bottle or other item to be labeled. Various waxes have been used as the heat transfer agent 14. Such waxes are typically used in the form of mixtures of various waxes and typically comprise mixtures including montan waxes, victory white wax, ethylene vinyl acetate resins, paraffins, low molecular weight polyethylenes, and the like. Typically, the wax layer is approximately 2.0 to 2.5 mils in thickness. Optionally, a protective lacquer 16, is applied to the transfer agent. The protective lacquer can be any of a wide variety of known materials including polyesters, acrylics, nitrocellulose, vinylidene chloride copolymers, etc. The protective lacquer serves as a protective coating over the ink once the label has been adhered to the desired item.

Heat transfer labels of the type described above may be applied to a surface, such as the outer surface of a plastic bottle, in the manner depicted in FIG. 2. As can be seen in FIG. 2, the heat transfer label 10 formed of the supporting carrier 12, the wax transfer agent 14, the optional protective lacquer layer 16, the ink(s) 18, and the optional adhesive lacquer 20 are pressed against the outer surface of a bottle 22. More specifically, the label 10 is placed against the bottle 22 such that the adhesive lacquer 20 or the binders contained in the inks 18 are in contact with the bottle surface, while heat and pressure are simultaneously applied to the reverse (carrier substrate 11) side of the label. The elevated temperature resulting from the thermal application causes the wax forming the heat transfer agent 14 to melt and split. At the same time, the adhesive lacquer 20 and/or the binder in the inks 18 becomes tacky. The tackified label is thus caused to adhere to the bottle surface while the carrier substrate 11 is removed. The result is a carrier substrate 11 comprising a supporting carrier 12 having a thinner layer of the heat transfer agent 14 on its surface, and a bottle 22, having the heat transferred label on its surface. The adhered label will retain a portion of the heat transfer agent 14 on its exposed surface.

One problem associated with the heat transfer labels described above is a result of the heat transfer agent. Specifically, the commonly used waxes leave a thin wax layer on the label surface. This wax layer is undesirable in that it often has a residual or natural tackiness that causes it to become soiled, thereby obscuring the label and producing an unappealing product. Additionally, being relatively soft, the wax is susceptible to physical damage (i.e., scratching, scraping, etc.) that detracts from the appearance of the label and the labeled product, as well as to chemical damage that can result if the label is exposed to certain chemical agents such as caustics.

Accordingly, a need exists for a heat transfer label and labeling system that substantially eliminates the residual heat transfer agent from the label once the label has been transferred to a surface. A need also exists for heat transfer labels and labeling systems that result in a label that has a tendency to remain clean and undamaged throughout its shelf life.

SUMMARY OF THE INVENTION

Broadly, the present invention relates to a heat transfer labeling system which comprises a carrier substrate, a polymeric layer disposed upon at least one surface of the carrier substrate, a transfer release agent disposed upon the polymeric layer and a label formed on the transfer release agent. The label comprises one or more inks, an optional adhesive lacquer and an optional protective lacquer. The invention is characterized in that it employs a novel carrier substrate and transfer release agent to minimize or eliminate the transfer of the transfer release agent to the label during the process in which the label is transferred to a substrate such as a package. Alternatively, in some embodiments of the present invention, the entire transfer release agent is transferred with the label, however, in these embodiments, the transfer release agent is a material which does not impart the disadvantages of conventional thick wax transfer release coatings.

As will be described in detail below, the carrier substrate may be a paper having a polymeric coating upon which the transfer release agent is coated. Alternatively, in one embodiment, the transfer release agent may be incorporated directly into the polymeric coating. Preferred polymeric coatings include cured epoxy acrylates, latex materials, and polyester, polyethylene or polypropylene films. Suitable transfer release agents include aqueous release coatings and polyacrylamides.

DETAILED DESCRIPTION OF THE INVENTION

The present invention relates to a heat transfer label that addresses the needs of the packaging industry. More particularly, the present invention relates to a heat transfer label and labeling system that substantially reduces or eliminates the use of wax as a heat transfer agent, thereby providing labeled products that are substantially or entirely free of residual wax on the exposed label surface. This is achieved primarily by providing heat transfer label systems that use novel substrates and/or transfer agents. Although, in certain embodiments, the transfer release agent is carried over to the label during the process of affixing the label to a substrate, in these embodiments, the transfer release agent is a material that does not impart the disadvantages of the thick wax coatings of the prior art.

As used herein, the term "heat transfer label" is intended to refer to that element that is transferred from a carrier onto the surface of the substrate to be labeled. Thus, the heat transfer label is intended to comprise, generally, an optional adhesive lacquer, one or more inks, and optionally, a protective lacquer. Likewise, the term "heat transfer label system" is intended to refer to the combination of the heat transfer label on a carrier substrate, such substrate including a supporting carrier and a transfer release agent. The transfer release agent may be either a layer on the substrate interposed between the substrate and the label, or it may be an integral portion of the substrate.

Several embodiments of the invention are contemplated. In each embodiment, the optional adhesive lacquer 20, the inks 18 and the optional protective lacquer 16 are the same. Thus, the invention is characterized primarily in the structure of the substrate carrier and transfer release agents. Furthermore, it should be understood that the optional adhesive lacquer 20, the inks 18 and the optional protective lacquer 16 are of materials and configurations commonly used in the art. Thus, the adhesive, if used, may be pattern printed onto the label, and conventional inks, adhesives and protective layers may be used. Thus, the invention is characterized in its use of the particular carriers and transfer release agents employed in the overall labeling system.

Figure 1:
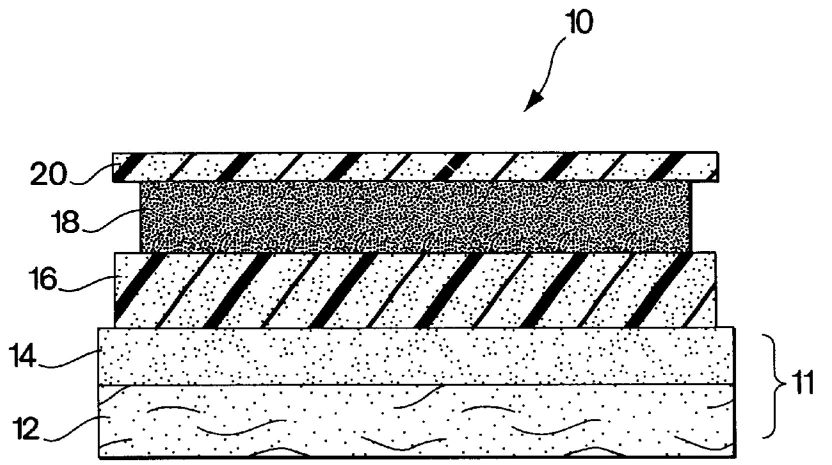
Fig. 1 (PRIOR ART)
FIG. 1 is a schematic depiction of a heat transfer labeling system of the prior art.
Figure 2:
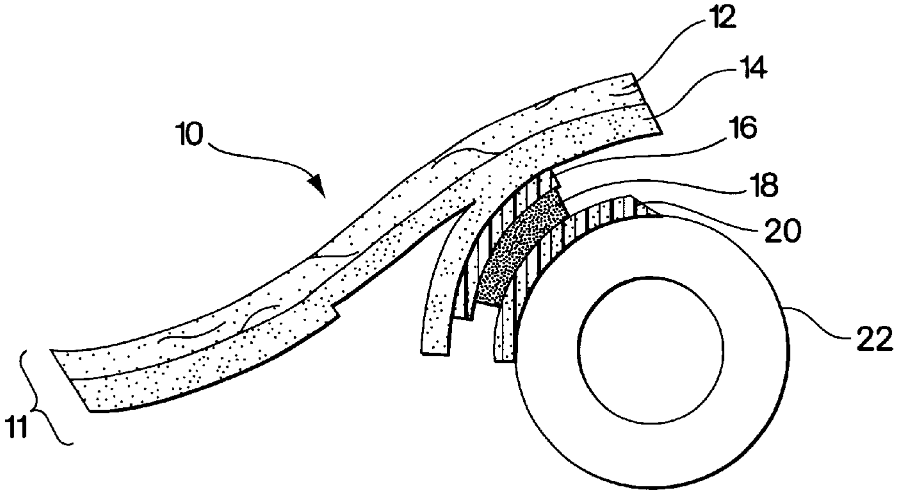
Fig. 2 (PRIOR ART)
FIG. 2 is a schematic depiction of a heat transfer label of the prior art being applied to a package.
Figure 3:
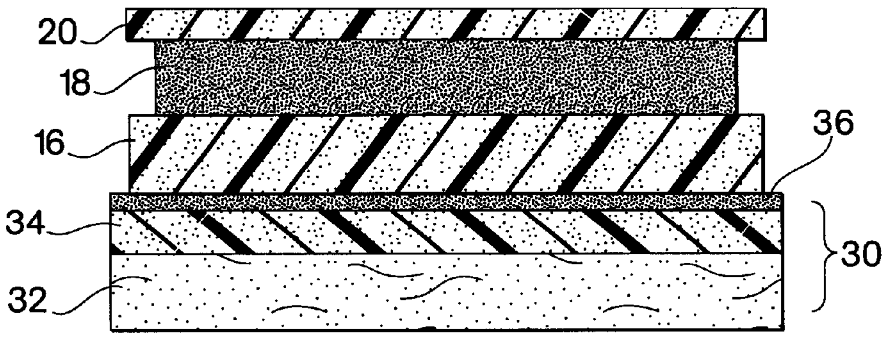
FIG. 3 is a schematic depiction of one embodiment of a heat transfer labeling system of the present invention.

In one embodiment, shown in FIG. 3, the carrier substrate 30 is formed of a paper 32 having an acrylic coating 34 thereon. The acrylic coating may be an epoxy acrylate that is cured using either an electron beam (EB-cured) or ultraviolet light (UV-cured). A thin transfer release agent 36 is then applied to the acrylic coating. As used throughout the specification, and unless otherwise noted, the term "transfer release agent " or simply "release agent" is intended to refer to an aqueous-based release agent. This aqueous-based release agent is typically a thin layer of wax that is applied from an aqueous dispersion. Thus, rather than being a wax layer of approximately 2.0–2.5 mils as is known in conventional heat transfer label technology, the transfer release agent of the present invention comprises a layer having a thickness of approximately 0.3 to 0.5 mils. The resulting release agent typically provides approximately 0.5 to 1.0 pounds of wax per 6000 square feet of coated surface. In one preferred embodiment, the release agent is formed from an aqueous dispersion of carnauba or montan wax. Heat transfer label systems formed using these carrier substrates offer advantages over those of the prior art in that they minimize the amount of wax remaining upon the label once the label has been applied and transferred to a surface such as a bottle surface. As such, the resulting labels are far less susceptible to damage, marring, and retention of dirt. The result is a label that retains its aesthetic appeal for an extended period of time.

Figure 4:
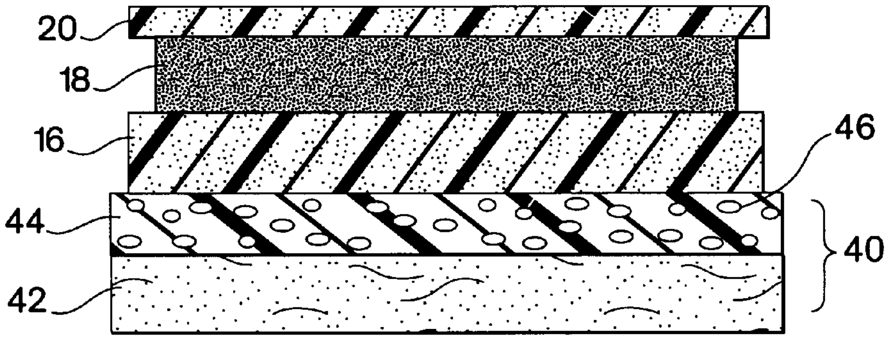
FIG. 4 is a schematic depiction of a second embodiment of a heat transfer labeling system of the present invention.

In another preferred embodiment, shown in FIG. 4, the transfer release agent is incorporated directly into the carrier substrate. In this embodiment, for example, the carrier substrate 40 can also comprise a paper supporting carrier 42 having an acrylic coating 44 thereon. Again, the acrylic coating may be an epoxy acrylate that is cured using either an electron beam (EB-cured) or ultraviolet light (UV-cured). However, unlike the embodiment above, in which a transfer release agent formed of a thin aqueous wax dispersion is applied to the acrylic coating, in this embodiment, the transfer release agent 46 is incorporated directly into the epoxy on the surface of the carrier. More specifically, the paper forming the supporting carrier 42 is provided with a coating comprising an EB- or UV-curable epoxy acrylate 44 into which has been mixed a dispersion 46 of the transfer release agent. A dispersion of carnauba wax in a radiation-curable monomer, such as tripropylene glycol diacrylate (TRPGDA) is preferred. In this embodiment, the transfer release agent remains within the epoxy acrylate coating prior to use of the heat transfer labeling system.

While not wishing to be bound by any particular theory of the mechanism of operation, it is believed that, upon heating during the transfer step, the transfer release agent "blooms" to the surface of the epoxy acrylate coating in its molten form. As in the previous embodiment, the molten transfer release agent releases the label from the carrier substrate, and the adhesive lacquer, being activated by the heating, affixes the label to the appropriate surface. Alternatively, it may be that the transfer release agent does not actually bloom to the surface of the carrier substrate, but rather is substantially distributed through the polymeric layer thereof in a manner which facilitates release and transfer of the label.

Figure 5:
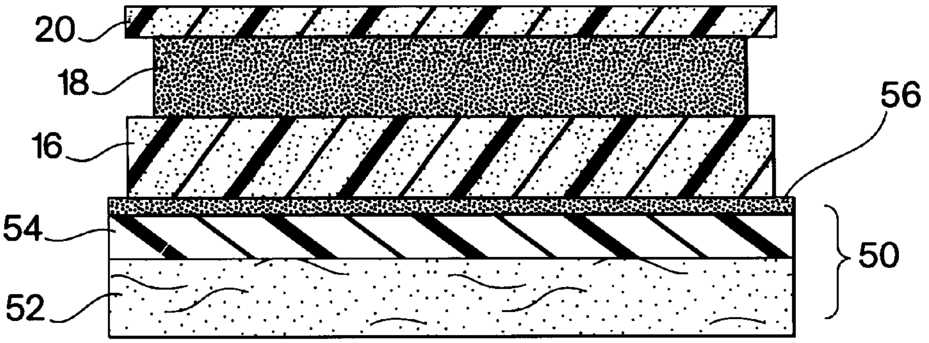
FIG. 5 is a schematic depiction of a third embodiment of a heat transfer labeling system of the present invention.

In still another embodiment of the present invention shown in FIG. 5, the epoxy acrylate used on the carrier substrate 50 can be replaced with a latex material 54. For example, the latex can be an acrylic or rubbery polymeric material contained in an aqueous dispersion. In one embodiment, the latex may be an aqueous dispersion of a styrene-butadiene rubber crosslinked with aziridine. The latex 54 dispersion is then coated upon a paper carrier 52 and optionally cured. If curing is used, it is preferred that the cure be a heat cure. Subsequently, an aqueous dispersion 56 as described above is applied to the carrier 52 to form the layer of transfer release agent.

Figure 6:
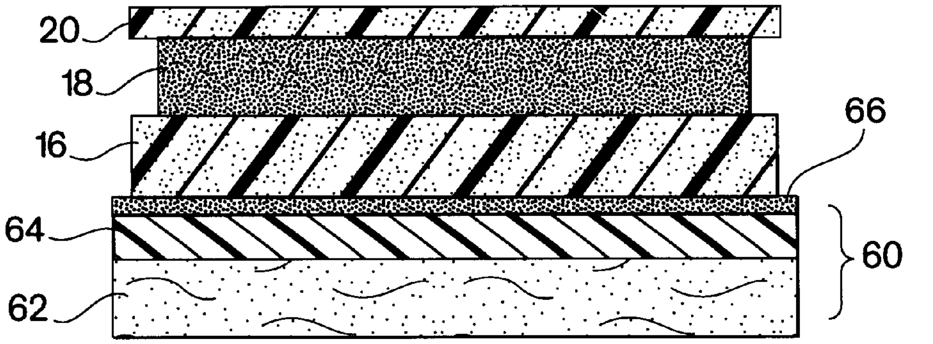
FIG. 6 is a schematic depiction of a fourth embodiment of a heat transfer labeling system of the present invention.

In yet another embodiment of the present invention shown in FIG. 6, the carrier substrate 60 comprises a polyester film 64 provided upon a paper surface 62. The polyester can be selected from any of a wide variety of polyesters. The polyester can be laminated to the paper, extruded thereon, or formed by any of a variety of methods known to those skilled in the art. A transfer release agent 66 is then applied to the exposed polyester surface. The transfer release agent 66 may be an aqueous dispersion of wax as described above, or alternatively, it may be formed of a polyacrylamide material. A wide variety of suitable polyacrylamides could be selected by those having ordinary skill in the art.

Similarly, the polyester film layer 64 described above may be replaced by a layer of a polyethylene or a polypropylene that has been extruded upon the paper carrier 62. As in the embodiment above, a transfer release agent 66, such as a polyacrylamide, is then applied to the exposed polyethylene or polypropylene surface.

As noted previously, one object of the present invention is to reduce or eliminate the transfer of the transfer release agent to the label during the process in which the label is affixed to a package or other substrate, or to eliminate the disadvantages associated with prior art labeling systems in which a thick wax coating is carried over to the label. In the embodiments in which the transfer release agent is provided by an aqueous dispersion of a wax, very little wax is transferred to the label. This results because the layer of the transfer release agent is very thin, so its splitting during transfer provides little wax that adheres to the label. In the embodiments in which the transfer release agent is a polyacrylamide, all of the polyacrylamide material is carried over to the label, however, the polyacrylamide material does not impart the disadvantages of the thick wax coatings known to the prior art.

In each of the embodiments described above, the label that is transferred to the substrate comprises an optional adhesive lacquer, one or more inks and an optional protective lacquer. In one preferred embodiment, the adhesive lacquer comprises a heat activated polyester adhesive, and the ink is preferably a vinyl or polyester ink, although other inks, such as polyamide inks and acrylic inks may be used as well. Likewise, the adhesive lacquer is not intended to be limited to polyester adhesives; rather, any suitable heat activated material can be used. As noted previously, if the ink includes a sufficient amount of binder, the optional adhesive lacquer need not be used. However, in most instances, it is desirable to provide the adhesive lacquer to enhance bonding of the label to the item upon which it is applied. If used, the optional protective lacquer is preferably a polyester lacquer. Any of a wide variety of known printing methods may be used to apply the inks and the optional lacquer. These include gravure printing, screen printing, flexographic printing and letter-press printing.

Figure 7:
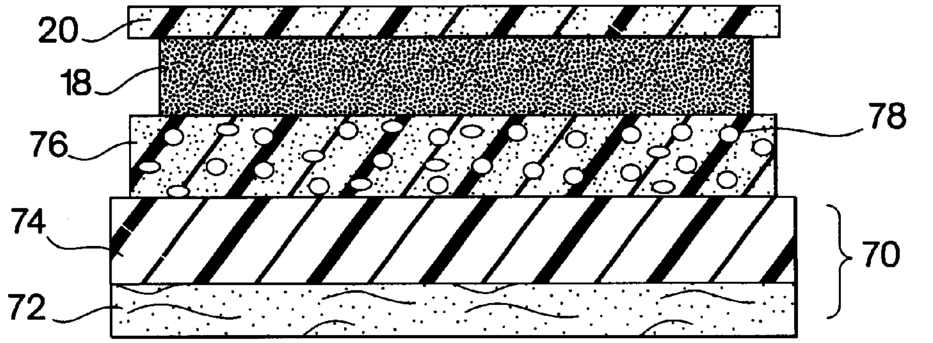
FIG. 7 is a schematic depiction of a fifth embodiment of a heat transfer labeling system of the present invention.

In one further embodiment of the present invention, a protective lacquer containing the transfer release agent is employed. Thus, in this embodiment, shown in FIG. 7, the transfer release agent does not comprise a separate layer formed upon the carrier substrate. In particular, this embodiment is characterized in that the carrier substrate 70 comprises, for example, a paper 72 having a polyethylene or a polypropylene layer 74 extruded upon its surface. A protective lacquer 76, such as a polyester which incorporates a transfer release agent 78 is printed onto the carrier. The protective lacquer 76, preferably contains at least about 5% by weight of the transfer release agent 78. In one preferred embodiment, the transfer release agent is a wax that is milled directly into the polyester protective lacquer prior to application of that lacquer to the carrier substrate. Suitable waxes include Neptune 5223, an oxidized polyethylene available from Shamrock Technologies of Newark, N.J., or Unithox 750, an ethoxylated alcohol available from Petrolite Corporation of Tulsa, Okla. Once the protective layer containing the transfer release agent is printed onto the carrier, one or more inks 18, as described previously, are printed onto the protective lacquer. Finally, an optional adhesive lacquer 20 may be applied to the inks.

During use of the label described above, the release transfer agent 78 contained in the protective lacquer 76 is transferred along with the entire label structure of protective lacquer, ink(s) and optional adhesive lacquer. The resulting label exhibits a matte rather than a glossy appearance and offers the numerous advantages of the labels of the present invention.

The heat transfer labels of the present invention are applied to surfaces in substantially the same manner as heat transfer labels previously known in the art. It is noted, however, that due to the improved transfer release agent layers, less heat and/or a shorter heating period is needed to activate the transfer release agent in order to transfer the label onto the desired substrate. In each case, however, the heating must be sufficient to activate the adhesive lacquer so that it may adhere to the surface upon which the label is being applied.

EXAMPLE

One embodiment of the present invention is illustrated by the following example. A carrier comprising a 30# one side clay coated paper having a UV-cured epoxy acrylate substrate layer on one surface was provided. The carrier was obtained from Sun Chemical Corporation of Round Lake, Ill. A transfer release agent comprising an aqueous dispersion of Carnauba wax (25% solids, Michem Lube #156) was formed upon the surface of the epoxy acrylate substrate layer. The label portion of the labeling system comprised a multilayered label having multiple layers of a vinyl ink contained between a polyester protective lacquer and a polyester adhesive lacquer. The label was provided on the carrier such that the protective polyester lacquer was positioned adjacent to the transfer release agent, and the adhesive lacquer was exposed. This configuration was achieved by pattern printing the protective layer upon the transfer release agent, printing the label inks upon the protective layer, and then applying the adhesive upon the printed inks.

The label was transferred to a polyester bottle by placing it against the bottle surface in a manner such that the adhesive was in contact with the bottle surface. On the opposite side of the labeling system, i.e., against the paper surface of the carrier, a platen heated to approximately 225° C. was applied. The heat was high enough to activate both the transfer release agent and the adhesive. The platen was withdrawn, and the carrier layer was withdrawn with it. This caused the transfer release agent to “split”, allowing a portion of it to be removed with the carrier, while a second portion of it remained adhered to the protective lacquer. The label, comprising the protective lacquer, the ink, and the adhesive was transferred to the bottle surface, remaining in place as a result of the adhesive action of the activated adhesive. Upon cooling, the adhesive solidified, leaving a transferred label permanently affixed to the bottle surface.

Equivalents

From the foregoing detailed description of the specific embodiments of the invention, it should be apparent that a novel heat transfer label and heat transfer labeling system has been described. Although particular embodiments have been disclosed herein in detail, this has been done by way of example for purposes of illustration only, and is not intended to be limiting with respect to the scope of the appended claims which follow. In particular, it is contemplated by the inventor that various substitutions, alterations, and modifications may be made to the invention without departing from the spirit and scope of the invention as defined by the claims.

What is claimed is:

1. A heat transfer labeling system which comprises:

a) a carrier substrate comprising i) a supporting carrier, and ii) a polymeric layer disposed upon at least one surface of the carrier substrate, the polymeric layer being selected from the group consisting of EB or UV-cured acrylics, latex materials, polyesters and polypropylenes;

b) a transfer release agent disposed upon the polymeric layer; and c) a label formed on the transfer release agent, the label comprising at least one ink and an adhesive lacquer disposed on the ink the adhesive lacquer comprising a heat activated polyester and the ink comprising a vinyl ink or a polyester ink.

2. A heat transfer labeling system as in claim 1 wherein the supporting carrier comprises a paper.

3. A heat transfer labeling system as in claim 1 wherein the label further includes a protective lacquer disposed upon the transfer release agent, said protective lacquer positioned between said transfer release agent and said at least one ink.

4. A heat transfer labeling system as in claim 3 wherein the protective lacquer comprises a polyester lacquer.

5. A heat transfer labeling system as in claim 1 wherein the polymeric layer comprises an acrylic polymer.

6. A heat transfer labeling system as in claim 5 wherein the transfer release agent comprises an aqueous dispersion of wax.

7. A heat transfer labeling system as in claim 5 wherein the transfer release agent is incorporated into the acrylic polymer.

8. A heat transfer labeling system as in claim 7 wherein the transfer release agent comprises a dispersion of a wax in a reactive monomer.

9. A heat transfer labeling system as in claim 8 wherein the transfer release agent comprises a dispersion of carnauba wax in a radiation-curable monomer.

10. A heat transfer labeling system as in claim 9 wherein the radiation-curable monomer comprises TRPGDA.

11. A heat transfer labeling system as in claim 1 wherein the polymeric layer comprises a latex polymer and the transfer release agent comprises an aqueous dispersion of wax.

12. A heat transfer labeling system as in claim 1 wherein the polymeric layer comprises a polyester film and the transfer release agent comprises an aqueous dispersion of wax.

13. A heat transfer labeling system as in claim 1 wherein the polymeric layer comprises a polyester film and the transfer release agent comprises a polyacrylamide.

14. A heat transfer labeling system as in claim 1 wherein the polymeric layer comprises a polypropylene film and the transfer release agent comprises a polyacrylamide.

15. A heat transfer labeling system as in claim 1 wherein the polymeric layer comprises a polypropylene layer extruded onto paper and the transfer release agent comprises a polyacrylamide.

16. A heat transfer labeling system which comprises:

a) a carrier substrate comprising i) a supporting carrier, and ii) a polymeric layer disposed upon at least one surface of the carrier substrate, the polymeric layer comprising a polyethylene;

b) a transfer release agent disposed upon the polymeric layer, the transfer release agent comprising a polyacrylamide; and c) a label formed on the transfer release agent, the label comprising at least one ink.

17. A heat transfer labeling system which comprises:

a) a carrier substrate comprising i) a supporting carrier, and ii) a polymeric layer disposed upon at least one surface of the carrier substrate;

b) a protective lacquer disposed upon the polymeric layer, the protective lacquer containing at least 5% by weight of a transfer release agent;

c) at least one ink printed on the protective lacquer; and optionally, d) an adhesive lacquer formed upon the at least one ink.

18. A heat transfer labeling system as in claim 3 wherein the protective lacquer comprises a lacquer selected from the group consisting of acrylic lacquers, nitrocellulose lacquers, and vinylidene chloride copolymers.

19. A heat transfer labeling system as in claim 17 wherein the protective lacquer comprises a lacquer selected from the group consisting of polyester lacquers, acrylic lacquers, nitrocellulose lacquers, and vinylidene chloride copolymers.

* * * * *